United States Patent [19]
Woods et al.

[11] 3,777,232
[45] Dec. 4, 1973

[54] MOTOR START WINDING SWITCH CONTROLLED BY PHASE OF MAIN WINDING CURRENT

[75] Inventors: Richard E. Woods, Markle; William H. Hohman, Bluffton, both of Ind.

[73] Assignee: Franklin Electric Co., Inc., Bluffton, Ind.

[22] Filed: Sept. 6, 1972

[21] Appl. No.: 286,761

[52] U.S. Cl. .............................. 318/221 E, 318/227
[51] Int. Cl. ............................................. H02p 1/44
[58] Field of Search .................. 318/220 R, 221 R, 318/221 E, 227

[56] References Cited
UNITED STATES PATENTS
3,489,969  1/1970  Knauer et al................... 318/221 E
3,530,348  9/1970  Conner............................ 318/221 E
3,671,830  6/1972  Kruper............................ 318/221 E

*Primary Examiner*—Gene Z. Rubinson
*Attorney*—Axel A. Hofgren et al.

[57] ABSTRACT

In a motor circuit for an AC motor having a main winding and a start winding, a control circuit utilizes a change in phase between the start winding current relative to the phase of another motor circuit signal to remove a trigger signal from a thyristor in series with the start winding in order to remove power from the start winding when the motor reaches a preselected cut-out speed. In one embodiment a change with motor speed of the relative phase between the main winding current and the applied voltage is utilized. Another embodiment utilizes the change with motor speed of the relative phase between the main winding current and the start winding current.

35 Claims, 3 Drawing Figures

PATENTED DEC 4 1973 3,777,232

MOTOR START WINDING SWITCH CONTROLLED BY PHASE OF MAIN WINDING CURRENT

BACKGROUND OF THE INVENTION

This invention relates to AC motor start winding switches, and in particular, to an electronic switch which is responsive to changes in relative phase between various motor circuit signals that correspond to changes in motor speed.

Many AC motors have a start winding which provides torque during the interval from initial application of power until the motor approaches synchronous speed. Once operating speed is reached, however, the torque supplied by the start winding is no longer needed, and the most efficient operation of the motor necessitates the removal of power from the start winding.

It is known to mount a mechanical centrifugal switch to the motor which, upon reaching the desired speed, opens the start winding circuit. Unfortunately, this approach has all of the disadvantages inherent to mechanical switches (e.g. corrosion, wear, adjustment of moving parts, etc.). Another known approach has been to utilize changes in both the relative phase and magnitude of various motor circuits signals that correspond to changes in motor speed to disconnect the start winding from the source of AC power. The disadvantage of this approach lies in the fact that the relative magnitude between two motor circuit signals may vary somewhat independently of changes in relative phase and that the relationship of motor speed to the amplitude of either current or voltage is dependent upon applied or line voltage which often results in switching speeds that vary widely with changes in line voltage or other parameters unrelated to the deisred cut-out speed.

SUMMARY OF THE INVENTION

The improved motor start windijng switch of the present invention overcomes the disadvantages of the switches noted above in a novel manner. The switches disclosed herein monitor speed dependent relative phase relationships of a pair of motor circuit signals independent of the magnitudes of these signals and actuate a switch to remove power from the start winding when the relative phase of the two signals being monitored assumes a value corresponding to a preselected cut-out speed.

In one embodiment of the start winding switch, the characteristic of the motor that the phase difference between the main winding current and the applied voltage changes with motor speed is utilized. Utilized in another embodiment is the characteristic of the motor that the phase difference between the main winding current and the start winding current changes with motor speed. In both embodiments a bidirectional triode thyristor in series with the start winding is continually provided with a gating or trigger signal to keep it in low impedance state until at the cut-out speed a control circuit prevents the trigger signal from being applied. When the trigger signal is removed from the thyristor, the thyristor is disabled from conducting current through the start winding and thus power is removed.

The control circuit comprises a disable circuit which generates a disable signal each time a selected one of a pair of motor circuit signals passes through a first preselected phase angle. The trigger signal generator is disabled from supplying the thyristor with trigger signals, if it receives the disable signal. However, a disable preventing circuit coupled to the disable circuit is included in the control circuit which generates a disable preventing signal in response to the other of the two pair of motor circuit signals passing through a second phase angle to prevent the disable signal from being received by the trigger signal generator and thereby maintain power applied to the start winding. The disable preventing circuit is effective to prevent disablement so long as the disable preventing signal occurs prior in time to the disable signal. When the motor reaches a preselected cut-out speed, the relative phase between the pair of motor circuit signals is such that the disable preventing signal is not generated prior to generation of the disable signal thereby causing the thyristor to lose its trigger signal and to assume a high impedance state to remove power from the start winding.

Thus an important feature of the present invention is the provision of an electronic start winding switch responsive to the relative phase between the main winding current and another motor circuit signal but independent of the magnitude of the signals to control power to the start winding.

Another feature of the present invention is the provision of an electronic start winding switch responsive to the relative phase between the main winding current and the applied voltage to control power to the start winding.

Still another feature of the present invention is the provision of an electronic start winding switch responsive to the relative phase of the main winding current to the start winding current for controlling power to the start winding.

A further feature of the present invention is the provision of an electronic start winding switch in which a circuit responsive to the phase of one of a pair of motor circuit signals prevents disablement of a power application controlling switch connected with the start winding by another circuit responsive to the phase of the other of the pair of motor circuit signals until reaching a preselected relative phase between the pair of signals which corresponds to a preselected motor speed.

BRIEF DESCRIPTION OF THE DRAWINGS

Further features and advantages of the invention will be apparent from the following description taken in conjunction with the accompanying drawings in which.

DESCRIPTION OF THE PREFERRED EMBODIMENT

Figure 1:
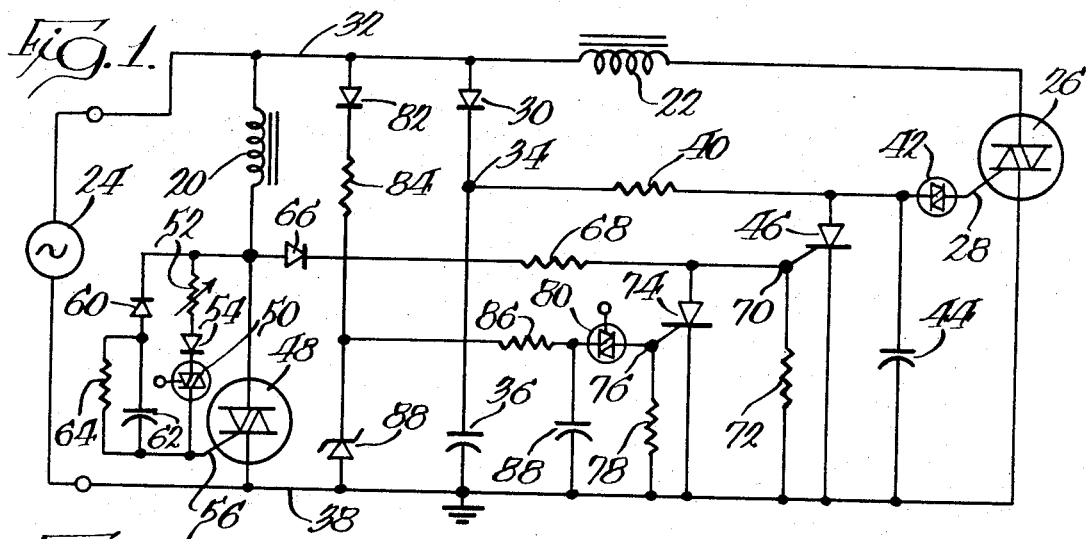
FIG. 1 is a circuit schematic of an embodiment of the start winding switch in which the change with motor speed of the relative phase between the main winding current and the applied voltage is utilized to control the application of power to the start winding.

Turning now to the drawings, a schematic circuit of a first embodiment of the present invention is shown in FIG. 1, and includes an AC electric motor having a main winding 20 and a start winding 22 both connectable with a suitable source of a periodic voltage 24, such as a line 115 volt AC, 60 Hertz power signal. A motor start winding switch circuit basically comprises a switch means such as a bidirectional triode thyristor 26 connected with start winding 22 for causing current to be conducted through start winding 22 except when disabled by an associated trigger circuit and a control means comprising the remainder of the circuitry for disabling the thyristor trigger circuit and thus thyristor 26 when the relative phase between the main winding current and the applied voltage across main winding 20 assumes a reselected value corresponding to a preselected cut-out speed of the motor.

The thyristor trigger signal generator provides a gate or trigger signal at gate 28 of the thyristor 26. The trigger signal keeps thyristor 26 in a low impedance state for conducting current through start winding 22 until it is removed by the control circuit when the cut-out speed is reached. When the trigger signal is removed, the thyristor assumes a high impedance state. The switch control circuit includes a disable means which generates a disable signal each time the main winding current passes through a preselected phase angle such as the negative-to-positive zero cross-over point or zero degree phase angle and a disable preventing means responsive to the applied voltage passing through a second preselected phase angle, which may also be the zero cross-over point, to prevent the disable signal from disabling the trigger signal generator. The disable preventing means is only effective to prevent disablement by the disable means when the applied voltage signal passes through the second phase angle prior to the main winding current passing through the first phase angle during each cycle.

Figure 3:
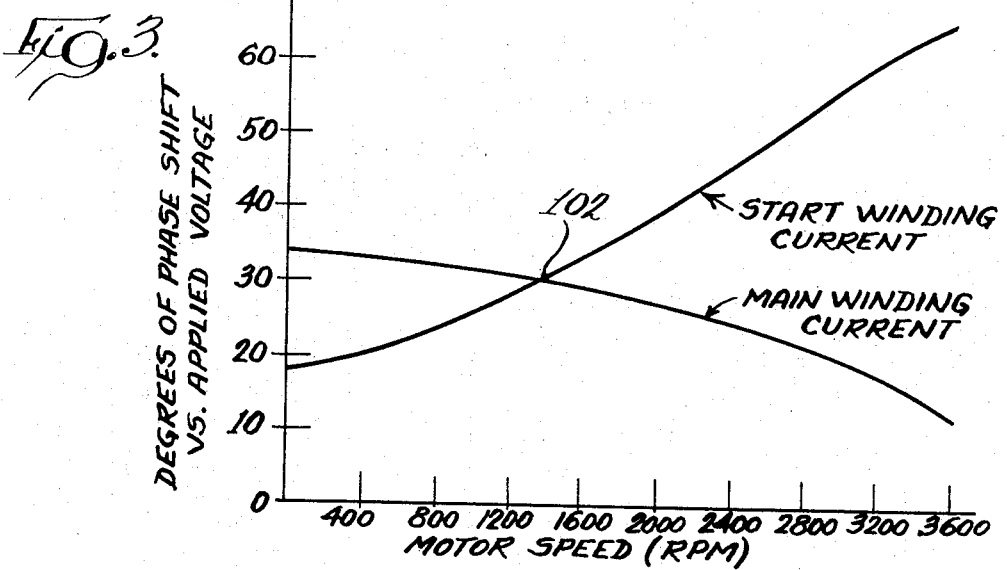
FIG. 3 is a graph of motor speed versus degrees of phase shift relative to applied voltage of the start winding current and the main winding current in a typical AC motor.

The relative phase between the main winding current and the applied voltage varies with motor speed in a typical fashion such as shown in the graph of FIG. 3. The first and second phase angles are of course selected such that the second phase angle of the applied voltage occurs prior to the first angle of the main winding current only until the desired cut-out speed is reached. At cut-out speed the relative phase between the two motor circuit signals has sufficiently changed so that the second phase angle of the applied voltage does not occur prior to the first phase angle of the main winding current, and thyristor 26 is disabled to remove power from the start winding.

The trigger signal generator which provides the gating signal at gate 28 of thyristor 26 comprises a diode 30 with its anode connected to the junction between the power source lead at one side 32 of AC power source 24 and start winding 22 and its cathode coupled to a junction 34. Junction 34, in turn, is coupled through a capacitor 36 to the power source lead at the other side 38 of AC power source 24, which may be grounded, and coupled through a resistor 40 to one side of a DIAC 42, the other side of which is coupled to ground reference potential on power source lead 38 through a capacitor 44. The other side of DIAC 42 is coupled to gate 28 of thyristor 26.

During the positive half-waves of the voltage from power source 24, when power source lead 32 is positive with respect to power source lead 38, diode 30 is forward biased and conducts current from lead 32 through resistor 40 to charge capacitor 44. Early in the positive half-wave cycle capacitor 44 builds up a charge exceedijng the breakover voltage of DIAC 42 to cause it to switch to a low impedance state at which time capacitor 44 discharges through DIAC 42 into gate 28 to trigger or enable thyristor 26 to assume a low impedance state to conduct current through start winding 22. After capacitor 44 has discharged the voltage thereacross falls below the requisite value needed to keep DIAC 42 in its low impedance state, and DIAC 42 in response thereto reverts to its high impedance state. When this occurs the current through diode 30 and resistor 40 again charge capacitor 44 until a sufficient voltage is developed thereacross to again cause DIAC 42 to assume a low impedance state at which time capacitor 44 is again discharged through DIAC 42 and the cycle is repeated. Thus, resistor 40, DIAC 42 and capacitor 44 function as a relaxation oscillator to provide periodic trigger pulses to gate 28 in thyristor 26. The frequency is determined by the charge and discharge times of capacitor 44.

Also during the positive half-wave of the applied voltage, current is conducted through diode 30 to charge capacitor 36. At the beginning of the negative half-wave of the applied voltage, when the voltage on power line 32 is less than ground reference potential at power line 38, diode 30 is reverse biased and capacitor 36 discharges through resistor 40 to repetitively charge capacitor 44 thereby enabling the tigger signal to continue throughout the negative half-wave. Thus, thyristor 26 is continually supplied with gate pulses and thyristor 26 is normally enabled to conduct current through start winding 22.

As stated, thyristor 26 is disabled from conducting current to start winding 22 when the gate signals are removed. This occurs when an SCR 46 coupled across capacitor 44 is gated into a low impedance state to discharge capacitor 44 thereby preventing it from charging sufficiently to switch on DIAC 42. SCR 46 may be considered as part of the disable means, the remaining circuitry of which comprises a second bilateral triode thyristor 48 in series with main winding 20 to conduct main winding current therethrough under control of associated gating circuitry.

The gating circuitry for thyristor 48 includes a silicon unilateral switch (SUS) 50 with a gate input 56 coupled through a positive temperature coefficient (PTC) thermistor 52 and a diode 54 to the junction between thyristor 48 and main winding 20. When the positive half-wave of the applied voltage exceeds the breakover voltage of SUS 50, a portion of the main winding current is conducted through thermistor 52, diode 54 and SUS 50 to the gate input 56 of thyristor 48 which assumes a low impedance state in response thereto to conduct the positive half-wave of the main winding current. Thyristor 48 remains in a low impedance state throughout the positive half-wave of the main winding current until the magnitude of the main winding current therethrough falls below a preselected value at which time it switches to a high impedance state. When this occurs a negative pulse is developed across thyristor 48 which is coupled through a diode 60 and a capacitor 62 to gate input 56 to trigger thyristor 48 innto its low impedance state for the negative half-wave of the main winding current.

This negative pulse at the beginning of the negative half-wave of the main winding current occurs only if thyristor 48 conducted the previous positive half-wave of main winding current. Thermistor 52 is provided to ensure that the thyristor 48 does not conduct the positive half-wave of the main winding current in the event of overheating of the motor due to a stalled rotor condition or the like. A suitable location for thermistor 52 is adjacent the inturns of motor start winding 22. When the temperature of the thermistor rises above a preselected temperature, the resistance of the thermistor rises to a corresponding value sufficiently high to prevent thyristor 48 from turning on during the positive half-wave of the main winding current. As stated, if thyristor 48 does not conduct the positive half-wave of main winding current, the trigger circuit of diode 60 and capacitor 62 will be ineffective to gate it on during the negative half-wave. Diode 54 in series with SUS 50 is provided to protect SUS 50 against high reverse voltages thereacross. A resistor 64 coupled across capacitor 62 is provided to bleed off any charge thereacross built up during the negative half-wave of the main winding current.

Each time thyristor 48 turns off after conducting the negative half-wave of main winding current, a positive pulse is developed across thyristor 48 which is coupled through a diode 66 and a resistor 68 to the gate input 70 of semiconductor controlled SCR rectifier 46. A resistor 72 is coupled between gate input 70 and ground to provide proper biasing for SCR 46. If this positive disable pulse is received at gate input 70, SCR 46 will turn on to disable the trigger signal generator circuit. The disable preventing means including an SCR 74 coupled between gate input 70 and ground is responsive to the applied voltage passing through a second preselected phase angle to turn on SCR 74 thereby shunting the positive pulse disable signal to ground so that it cannot be received at gate input 70 to disable the trigger signal generator. The SCR 74 is switched on whenever it receives a gate signal at its gate input 76. Gate input 76 is coupled through a resistor 78 to ground for providing proper bias therefor, and coupled to a second SUS 80 which couples a gate signal thereto when the applied voltage passes through the second phase angle. The other side of SUS 80 is coupled to the power source lead 32 through a diode 82, a resistor 84, and a resistor 86, and coupled to ground through a capacitor 88. The junction between resistors 84 and 86 is coupled to ground through an avalanche breakdown diode 88 which regulates the voltage threat to limit it to a value equal to its breakdown voltage.

During the positive half-wave of applied voltage, current is conducted through diode 82, resistor 84, and resistor 86 to charge capacitor 88. At a preselected second phase angle of the applied voltage the charge across capacitor 88 is sufficiently high to render SUS 80 conductive which discharges capacitor 88 therethrough to gate on SCR 74. The value of the second preselected phase angle of course depends upon the charging time of capacitor 88 which, if desired, could be variable. Once SUS 80 turns on it latches to provide continuous gate current throughout the positive half-wave of the applied voltage.

Depending upon the relative phase between the main winding current and the applied voltage, SCR 74 will turn on either before or after the positive pulse disable signal. At motor speeds less than cutout speed, SCR 74 will be turned on prior to the positive pulse disable signal and will shunt it to ground thereby preventing reception by gate 70 of SCR 46 and thus preventing disablement of the trigger signal generator. However, at cut-out speed the positive pulse disable signal will be generated prior to SCR 74 being rendered conductive, and the disable signal will be received at gate input 70 to disable the trigger signal generator circuit thereby disabling thyristor 26 to remove power from start winding 22.

Figure 2:
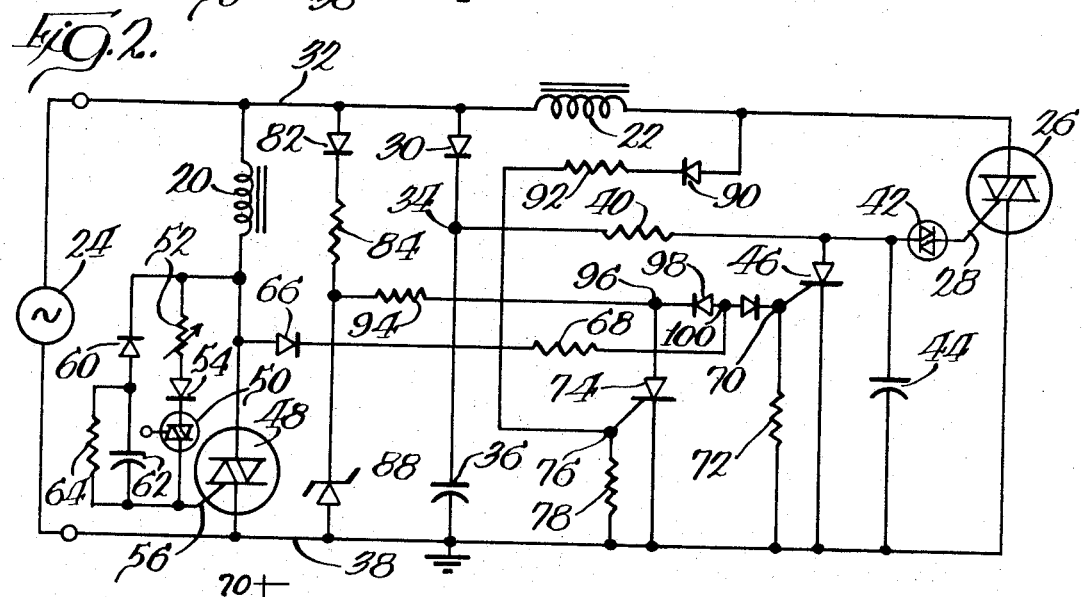
FIG. 2 is a circuit schematic of a different embodiment in which the change with motor speed of the relative phase between the main winding current and the start winding current is utilized to control the application of power to the start winding.

A circuit schematic of another embodiment of the present invention is shown in FIG. 2. This circuit is similar to the one shown in FIG. 1 except that it compares the phase of the main winding current relative to the start winding current rather than the phase of the main winding current relative to applied voltage.

A graph of a typical change with motor speed of the relative phase between these two signals is shown in FIG. 3. The trigger signal generator circuit and the disable signal generator circuit of FIG. 2 function in substantially the same manner as the corresponding circuits in FIG. 1, and the elements of the circuit of FIG. 2 having the same or like function of corresponding elements in the circuit of FIG. 1 will be designated by the same reference numerals.

SCR 74 of the disable preventing circuit gated on to shunt the disable signal to ground in response to the phase of the applied voltage in the circuit of FIG. 1, is gated on by a signal responsive to the start winding current in the circuit of FIG. 2. In particular, when thyristor 26 returns to a high impedance state at the end of the negative half-wave of start winding current, a positive pulse is developed there-across. This positive pulse is coupled through a diode 90 and a resistor 92 to gate input 76 of SCR 74. A source of current taken from the junction between resistor 84 and avalanche diode 88 through a resistor 94 is coupled to the anode 96 of SCR 74 so that once turned on by the gate signal from diode 90 and resistor 92, it will latch into a low impedance state for the remainder of the positive half-wave of the applied voltage. A diode 98 is coupled between the anode of SCR 74 and a junction 100, at which appears the positive pulse disable signal, to isolate gate input 70 of SCR 46 from the latching current source for SCR 74. A second diode coupled between junction 100 and gate input 70 of SCR 46 is provided to compensate for the voltage drop across diode 98.

As similar to the circuit of FIG. 1, when the start winding current passes through a second preselected phase angle, such as the zero cross-over point, SCR 74 will be gated into a low impedance state. If this occurs prior to the main winding current passing through the first phase angle, the positive pulse disable signal will be shunted to ground thereby preventing it from turning on SCR 46 to disable the trigger signal generator. In the circuit of FIG. 2, SCR 74 is gated at the negative-to-positive zero cross-over point of the start winding current, as is the positive pulse disable signal generated at the zero cross-over point of the main winding current. In this situation the cut-out speed will be that speed at which the phase shift of the start winding current relative to the applied voltage is equal to the phase shift of the main winding current relative to the applied voltage. As graphically illustrated in FIG. 3, this occurs at the speed where the start winding current and main winding current curves cross at 102. By providing a delay circuit to either the positive pulse disable signal or the gate pulse for SCR 74 of the disable preventing circuit, the cut-out speed could be changed in either direction depending upon which pulse is delayed.

It should be appreciated that although particular circuit embodiments are disclosed, many variations could be made while still keeping within the broad concept of the present invention, and applicant does not intend to limit the invention to only the particular circuits shown. For example, although the disable signal is generated in response to the start winding current passing through a preselected phase angle and prevented from being effective to disable the thyristor by a circuit responsive to either the applied voltage or start winding current passing through a second preselected phase angle, it is contemplated that the disable and disable preventing means could be responsive to the phase of the applied voltage or the start winding current and the main winding current, respectively.

I claim:

1. In a motor circuit for an electric motor having a main winding and a start winding both connectable with a source of periodic voltage, said motor circuit when connected with the source of periodic voltage providing a pair of signals including a main winding current signal, the relative phase between which varies with motor speed, a circuit for controlling the application of power to the start winding, comprising:
   switch means connected with said start winding for causing current conduction through said start winding except when disabled; and
   control means for controlling said switch means including
   disable means responsive to the phase of one of said pair of signals to disable said switch means, and
   disable preventing means responsive to the phase of the other of said pair of electrical signals for preventing said disable means from disabling the switch means until the relative phase between the pair of electrical signals assumes a preselected value corresponding to a preselected cut-out speed of the motor.

2. The control circuit of claim 1 in which said switch means includes a switch connected with the start winding and trigger means for enabling said switch to cause conduction through said start winding.

3. The control circuit of claim 2 in which said disable means comprises means for disabling said trigger means from enabling the switch, said switch being disabled when not enabled.

4. The control circuit of claim 2 in which said trigger means generates a trigger signal and said switch is responsive to said trigger signal to cause current conduction through said start winding until said trigger signal is removed, said trigger signal being removed when the trigger means is disabled.

5. The control circuit of claim 4 in which said trigger means comprises a relaxation oscillator.

6. The control circuit of claim 2 in which said switch is in series circuit with the start winding.

7. The control circuit of claim 2 in which said switch means comprises a thyristor having a gate input connected with the trigger means.

8. The control circuit of claim 1 in which said pair of signals includes the applied voltage.

9. The control circuit of claim 8 in which said one of said pair of signals comprises the main winding current.

10. The control circuit of claim 1 in which said pair of signals includes the start winding current.

11. The control circuit of claim 10 in which said one of said pair of signals comprises the main winding current.

12. The control circuit of claim 1 in which said one of said pair of signals comprises the main winding current.

13. In a motor circuit for an electric motor having a main winding and a start winding both connectable with a source of periodic voltage, said motor circuit when connected with the source of periodic voltage providing a pair of signals including a main winding current signal, the relative phase between which varies with motor speed, a circuit for controlling the application of power to the start winding, comprising:
   switch means connected with said start winding for causing current conduction through said start winding except when disabled; and
   control means for controlling said switch means including
   disable means for generating a disable signal in response to the said one of said pair of electrical signals passing through a first preselected phase angle, said switch means being disabled in response to reception of said disable signal, and
   disable preventing means responsive to the other of said pair of electrical signals passing through a second preselected phase angle prior to generation of said disable signal to prevent reception thereof by said switch means, said other of said pair of signals passing through said second preselected phase angle prior to said one of said pair of signals passing through said first preselected phase angle only until the relative phase between the signals assumes a preselected value corresponding to a preselected cut-out speed of the motor.

14. The control circuit of claim 13 in which said switch means includes a switch connected with the start winding and a trigger means for enabling the switch to cause conduction through said start winding, said trigger means being disabled in response to reception of said disable signal.

15. The control circuit of claim 13 in which said first phase angle comprises zero degrees.

16. The control circuit of claim 13 in which said one of said pair of electrical signals comprises the main winding current.

17. The control circuit of claim 16 in which said other of said pair of signals comprises the applied voltage.

18. The control curcuit of claim 17 in which said disable preventing means includes a switching device means having first and second states connecting between said switch means and said disable means, and means for switching said switching device means from its first state to its second state in response to the applied voltage passing through said preselected phase angle, said disable signal being prevented from being received by said switch means when said switching device means is in said second state.

19. The control circuit of claim 18 in which said second state comprises a low impedance state and said disable signal is shunted away from said switch means through said switching device means when in said low impedance state.

20. The control circuit of claim 19 in which said switching device means comprises a semiconductor controlled rectifier gatable into a low impedance state in response to the applied voltage passing through said second phase angle.

21. The control circuit of claim 16 in which said other of said pair of signals comprises the start winding current.

22. The control circuit of claim 21 in which said disable preventing means includes a switching device means having first and second states connecting between said switch means and said disable means, and means for switching said switching device means from its first state to its second state in response to the start winding current passing through said preselected phase angle, said disable signal being prevented from being received by said switch means when said switching device means is in said second state.

23. The control circuit of claim 22 in which said second state comprises a low impedance state and said disable signal is shunted away from said switch means through said switching device means when in said low impedance state.

24. The control circuit of claim 22 in which said switching device means comprises a semiconductor controlled rectifier gatable into a low impedance state in response to the start winding current passing through said second phase angle.

25. The control circuit of claim 13 in which said disabling means includes a switching device means in series with the main winding for conducting main winding current therethrough, said switching device means developing a voltage pulse thereacross at the beginning of each positive half-wave of main winding current to produce said disable signal.

26. The control circuit of claim 25 in which said switching device comprises a thyristor.

27. The control circuit of claim 25 in which said switching device means includes means response to the temperature of the motor for removing power from the main winding.

28. The control circuit of claim 13 in which said disable preventing means includes a switching device means having first and second states connecting between said switch means and said disable means, and means for switching said switching device means from its first state to its second state in response to one of said pair of signals passing through said preselected phase angle, said disable signal being prevented from being received by said switch means when said switching device means is in said second state.

29. In an electric motor having a main winding and a start winding both connectable with a source of periodic voltage, said motor when connected with a source of periodic voltage developing a pair of signals comprising the main winding current and the start winding current, the relative phase between said pair of signals varying with motor speed, a control circuit for controlling the application of power to the start winding, comprising:

switch means connected with the start winding for causing current therethrough except when disabled; and control means for disabling said switch means in response to said relative phase assuming a preselected value corresponding to a preselected cut-out speed of the motor.

30. The control circuit of claim 29 in which said control means includes disable means responsive to the phase of one of said pair of signals to disable said switch means, and disable preventing means responsive to the phase of the other of said pair of electrical signals for preventing said disable means from disabling said switch means until said relative phase assumes said preselected value.

31. The control circuit of claim 29 in which said switch means includes a switch connected with the start winding and trigger means for providing said switch with a trigger signal, said switch being enabled to cause current conduction when said trigger signal is generated and disabled when said trigger signal is not being generated.

32. The control circuit of claim 31 in which said disable means includes means for disabling said trigger means from generating said trigger signal.

33. The control circuit of claim 30 in which said disable means includes means for generating a disable signal in response to one of said pair of signals passing through a first preselected phase angle, said switch means being disabled in response to reception of said disable signal, and said disable preventing means includes means responsive to the other of said pair of signals passing through a second preselected phase angle prior to generation of said disable signal to prevent reception thereof by said switch means.

34. The control circuit of claim 33 in which said one of said pair of electrical signals comprises the main winding current and the other of said pair of signals comprises the start winding current.

35. The control circuit of claim 30 in which said one of said pair of electrical signals comprises the main winding current and the other of said pair of signals comprises the start winding circuit.

* * * * *